(12) United States Patent
Venkatadri et al.

(10) Patent No.: US 11,796,367 B2
(45) Date of Patent: Oct. 24, 2023

(54) FLUID CONTROL SYSTEM

(71) Applicant: Analog Devices, Inc., Wilmington, MA (US)

(72) Inventors: Vikram Venkatadri, Ayer, MA (US); David Frank Bolognia, Charlestown, MA (US)

(73) Assignee: ANALOG DEVICES, INC., Wilmington, MA (US)

(*) Notice: Subject to any disclaimer, the term of this patent is extended or adjusted under 35 U.S.C. 154(b) by 0 days.

(21) Appl. No.: 17/315,050

(22) Filed: May 7, 2021

(65) Prior Publication Data
US 2022/0357192 A1 Nov. 10, 2022

(51) Int. Cl.
*G01F 3/22* (2006.01)
*G01F 1/06* (2006.01)
*G01F 3/20* (2006.01)

(52) U.S. Cl.
CPC ............... *G01F 3/226* (2013.01); *G01F 1/06* (2013.01); *G01F 3/20* (2013.01); *G01F 3/227* (2013.01)

(58) Field of Classification Search
CPC ........ G01F 1/06; G01F 1/065–08; G01F 3/10; G01F 3/222; G01F 3/226; G01F 3/24; G01F 11/125; G01F 3/20
See application file for complete search history.

(56) References Cited

U.S. PATENT DOCUMENTS

| | | |
|---|---|---|
| 2,729,976 A | 1/1956 | Laub |
| 2,911,827 A * | 11/1959 | Hanks .................. G01F 3/20 418/45 |
| 3,845,814 A * | 11/1974 | Kun ...................... B21D 53/04 29/890.039 |
| 3,894,538 A | 7/1975 | Richter |
| 4,155,362 A | 5/1979 | Jess |
| 4,335,835 A | 6/1982 | Beigler et al. |
| 4,587,843 A | 5/1986 | Tokura et al. |
| 4,677,850 A | 7/1987 | Miura et al. |
| 4,688,424 A | 8/1987 | Handtmann et al. |
| 4,829,818 A | 5/1989 | Bohrer |

(Continued)

FOREIGN PATENT DOCUMENTS

| | | |
|---|---|---|
| DE | 10 2014 202 853 A1 | 8/2015 |
| DE | 10 2014 112 261 A1 | 3/2016 |

(Continued)

OTHER PUBLICATIONS

International Search Report and Written Opinion in International Application No. PCT/US2021/027412, dated Aug. 13, 2021.

(Continued)

*Primary Examiner* — Justin N Olamit
(74) *Attorney, Agent, or Firm* — Knobbe, Martens, Olson & Bear LLP

(57) ABSTRACT

A flow meter is disclosed. The flow meter can include a housing that has a cavity. The flow meter can also include a deformable tube that is disposed in the cavity. The deformable tube can comprise a portion of a flow path of a fluid substance. The flow meter can further include a cam that is rotatably coupled to the housing. A portion of the cam is configured to press against a portion of the collapsible tube so as to deform the portion of the collapsible tube. The cam can be configured to rotate in response to a flow of the fluid substance in the flow path.

20 Claims, 11 Drawing Sheets

(56) References Cited

U.S. PATENT DOCUMENTS

| | | | |
|---|---|---|---|
| 4,912,974 A | 4/1990 | Inada et al. | |
| 5,073,094 A | 12/1991 | Dorman et al. | |
| 5,081,866 A | 1/1992 | Ochiai et al. | |
| 5,222,395 A | 6/1993 | Matubara et al. | |
| 5,269,443 A * | 12/1993 | Lancaster | G01F 11/125 |
| | | | 222/207 |
| 5,527,288 A | 6/1996 | Gross et al. | |
| 5,792,952 A | 8/1998 | Ritchart | |
| 5,831,159 A | 11/1998 | Renger | |
| 6,537,437 B1 | 3/2003 | Galambos et al. | |
| 6,591,674 B2 | 7/2003 | Gehman et al. | |
| 6,607,495 B1 | 8/2003 | Shalak et al. | |
| 6,699,234 B2 | 3/2004 | Yeh | |
| 6,889,559 B2 | 5/2005 | Gimson | |
| 7,096,729 B2 | 8/2006 | Repko et al. | |
| 7,231,839 B2 * | 6/2007 | Huber | F04B 19/006 |
| | | | 73/864.22 |
| 7,985,057 B2 | 7/2011 | Haar | |
| 8,088,333 B2 | 1/2012 | Ahmad | |
| 8,226,597 B2 | 7/2012 | Jacobson et al. | |
| 8,756,990 B2 | 6/2014 | Speldrich | |
| 9,132,231 B2 | 9/2015 | Gross et al. | |
| 9,492,614 B2 | 11/2016 | Kamen et al. | |
| 9,599,496 B2 | 3/2017 | Asano et al. | |
| 9,616,171 B2 | 4/2017 | Qin et al. | |
| 9,661,408 B2 | 5/2017 | Kierse et al. | |
| 10,191,023 B2 | 1/2019 | Bather et al. | |
| 2005/0045480 A1 | 3/2005 | Krumme | |
| 2006/0079862 A1 | 4/2006 | Genosar | |
| 2011/0060280 A1 | 3/2011 | Caffey et al. | |
| 2011/0177411 A1 * | 7/2011 | Wu | H01M 8/04216 |
| | | | 429/426 |
| 2011/0275996 A1 | 11/2011 | Gyory et al. | |
| 2014/0135699 A1 | 5/2014 | Gyory | |
| 2016/0105737 A1 | 4/2016 | Kierse et al. | |
| 2017/0021145 A1 | 1/2017 | Saul et al. | |
| 2017/0115149 A1 | 4/2017 | Silpachai et al. | |
| 2017/0232189 A1 | 8/2017 | Qin et al. | |
| 2018/0058894 A1 | 3/2018 | Pearson et al. | |
| 2018/0266984 A1 | 9/2018 | Pratt et al. | |
| 2019/0126018 A1 | 5/2019 | Browd et al. | |
| 2019/0135614 A1 | 5/2019 | Kierse et al. | |
| 2019/0184095 A1 | 6/2019 | Kim et al. | |
| 2019/0255254 A1 | 8/2019 | Wilmont et al. | |
| 2020/0158791 A1 | 5/2020 | Marauska et al. | |
| 2021/0180586 A1 * | 6/2021 | Bozic | F04B 23/06 |
| 2021/0196884 A1 | 7/2021 | Kim et al. | |
| 2021/0322681 A1 | 10/2021 | Bolognia et al. | |
| 2022/0062535 A1 | 3/2022 | Bolognia et al. | |
| 2022/0333958 A1 | 10/2022 | Bolognia et al. | |

FOREIGN PATENT DOCUMENTS

| | | | | |
|---|---|---|---|---|
| EP | 3616737 A2 | 3/2020 | | |
| GB | 1452104 | 10/1976 | | |
| WO | WO 95/13839 | 5/1995 | | |
| WO | WO-2012159026 A1 * | 11/2012 | | A61F 9/0026 |
| WO | WO 2020/040519 A1 | 2/2020 | | |

OTHER PUBLICATIONS

International Search Report and Written Opinion in International Application No. PCT/US2021/047551, dated Nov. 25, 2021.

Seo et al., "Rapid detection of COVID-19 causative virus (SARS-CoV-2) in human nasopharyngeal swab specimens using field-effect-transistor-based biosensor," ACS Nano 2020, American Chemical Society, vol. 14, pp. 5135-5142.

* cited by examiner

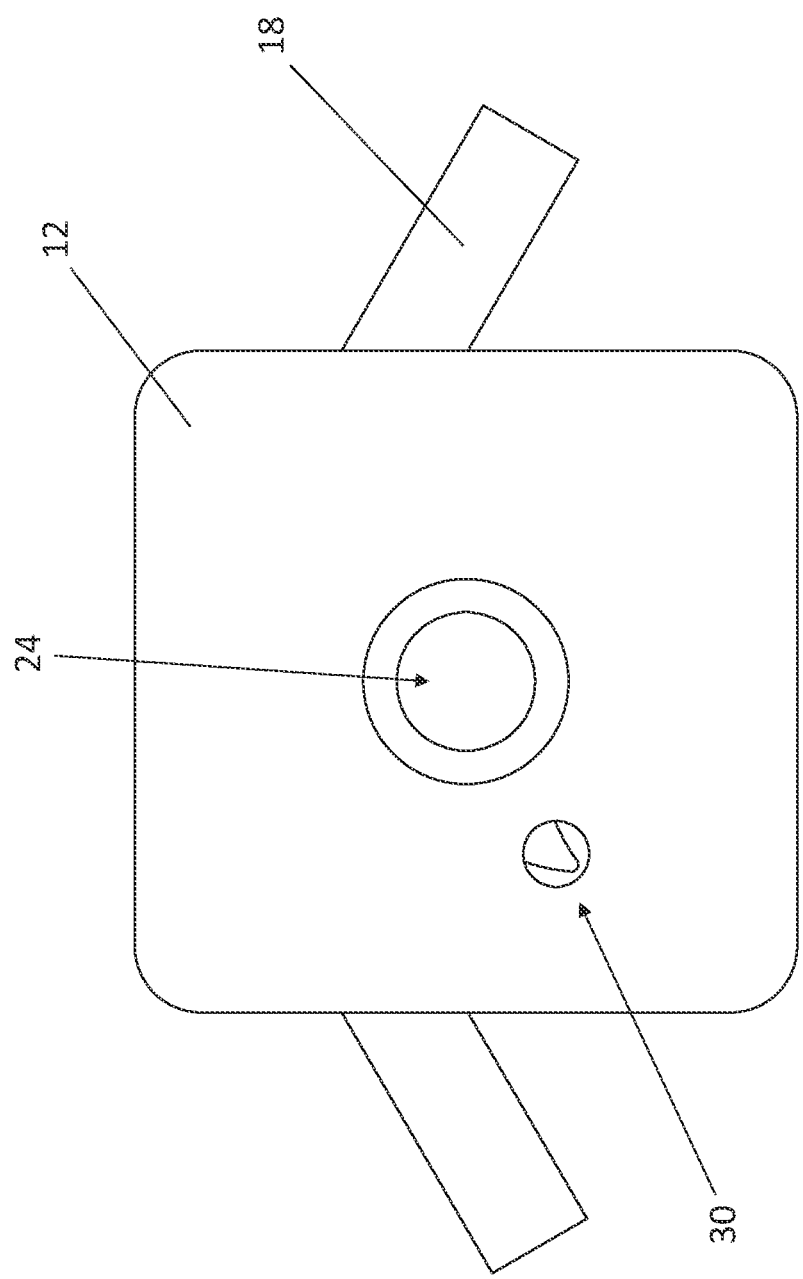

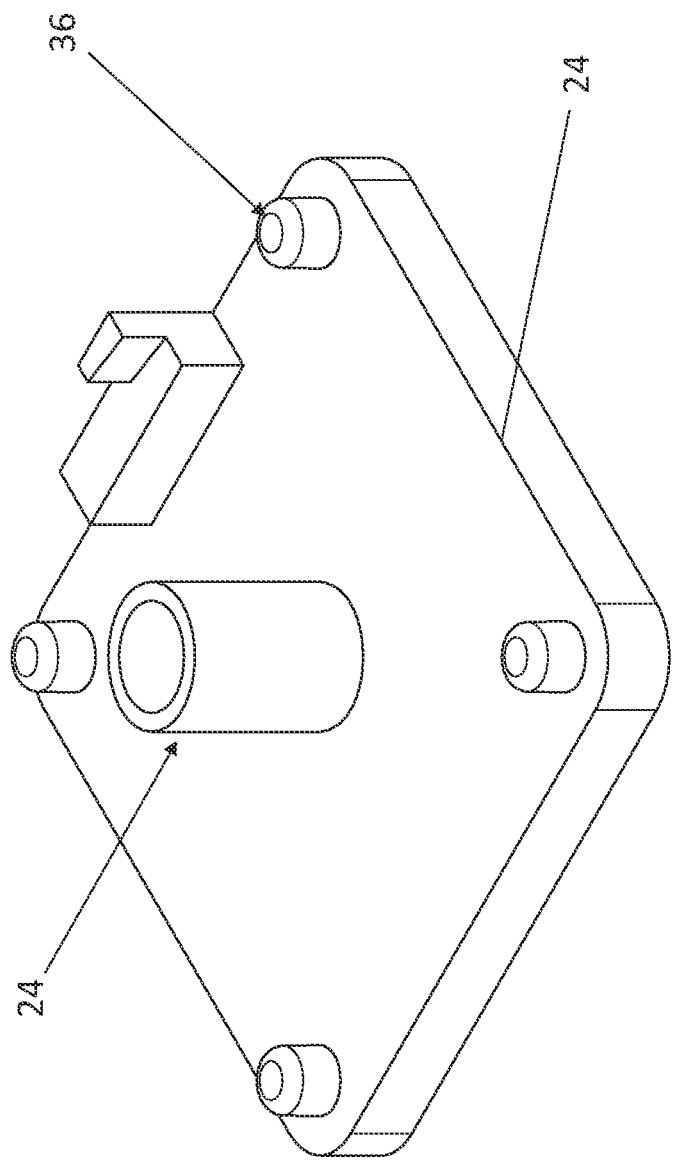

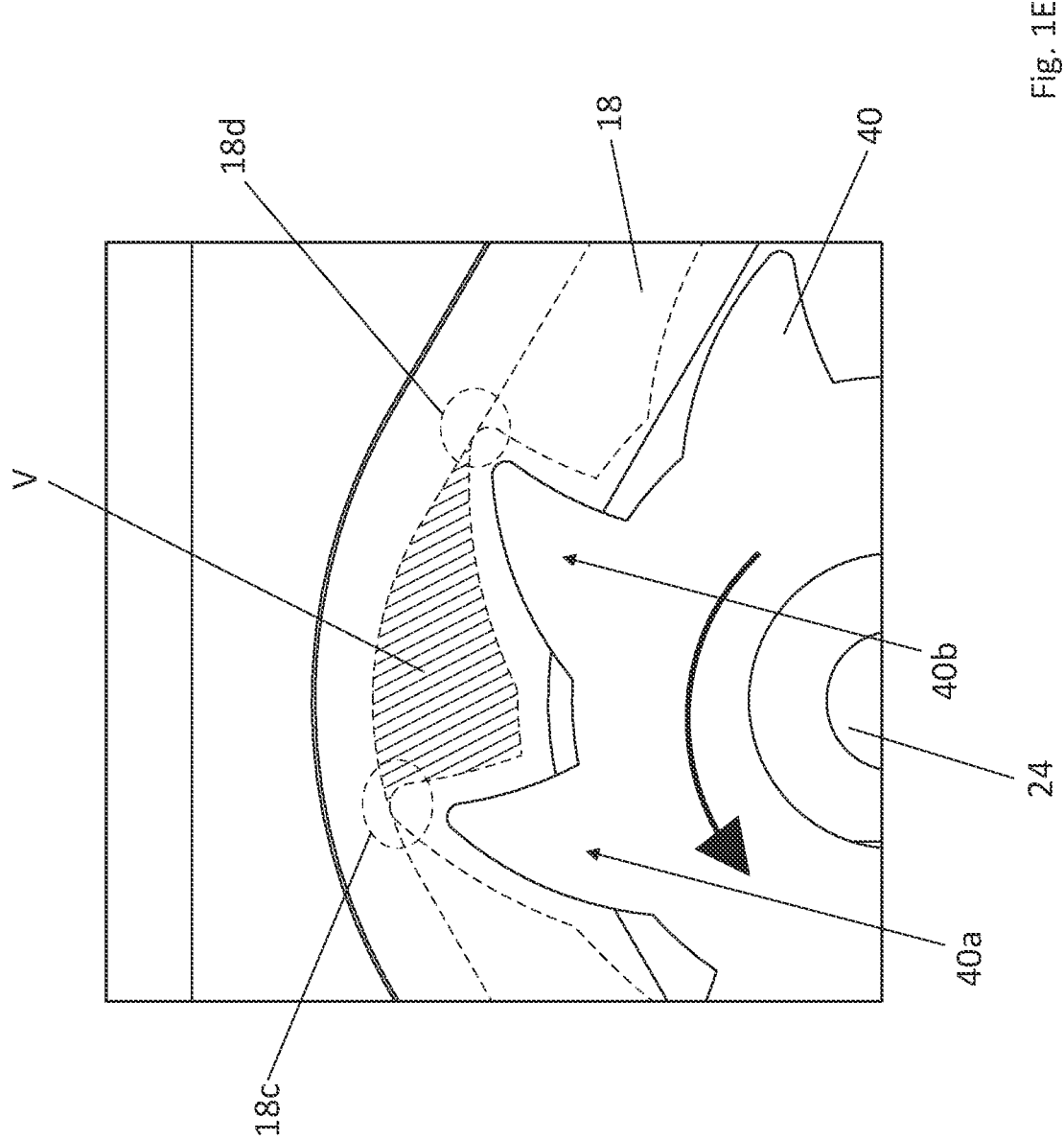

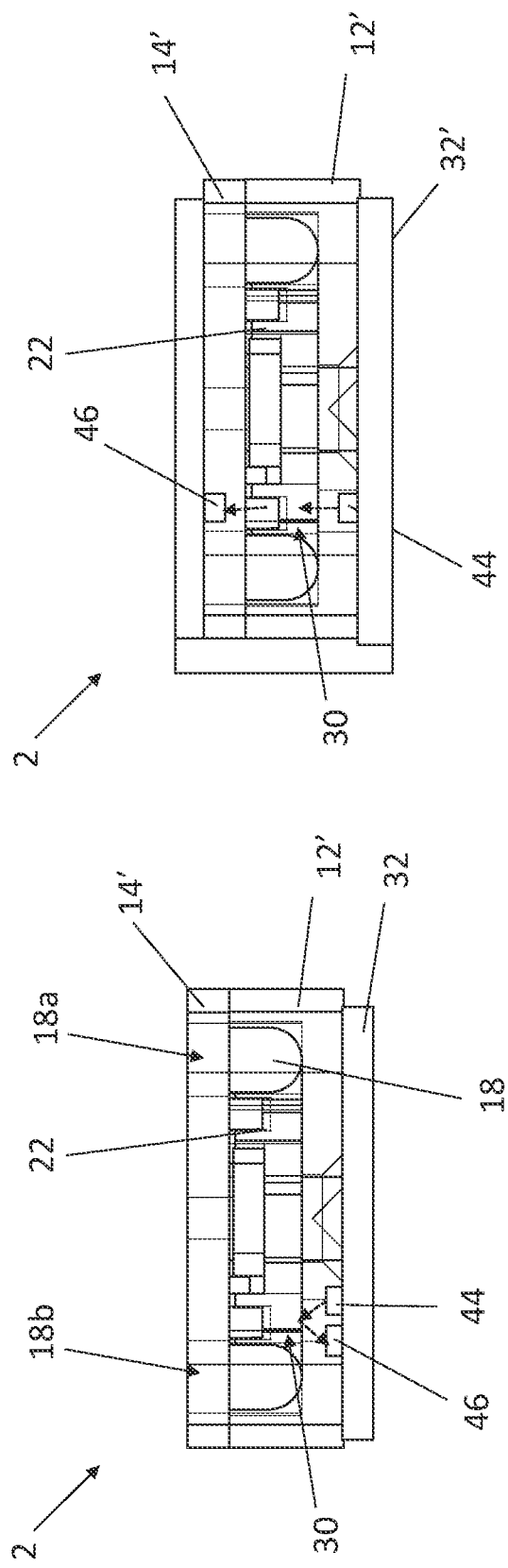

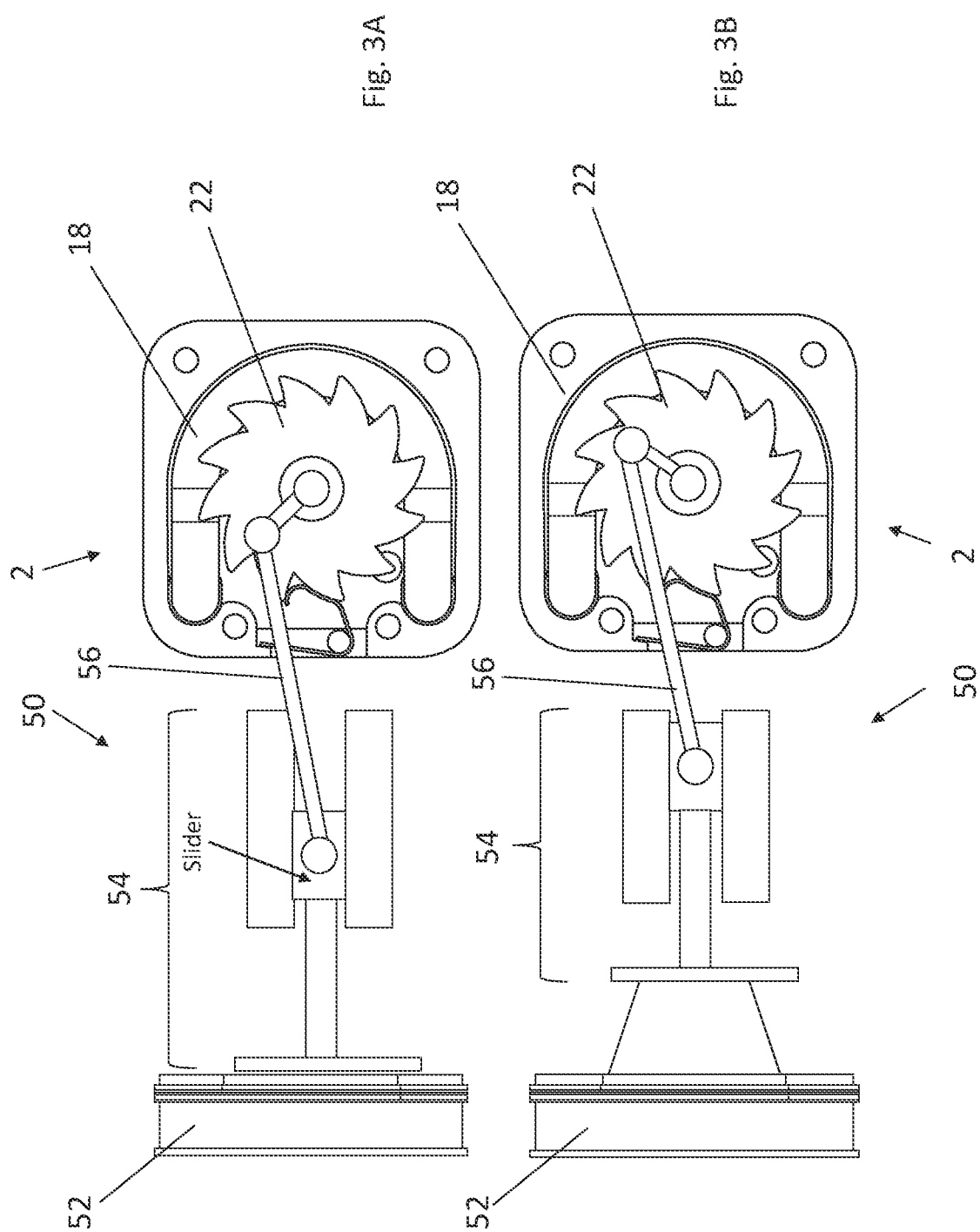

FLUID CONTROL SYSTEM

CROSS-REFERENCE TO RELATED APPLICATIONS

This application is related to U.S. patent application Ser. No. 16/851,798, entitled "FLUID DELIVERY DEVICE," filed Apr. 17, 2020, U.S. patent application Ser. No. 16/859,665, entitled "DEVICE WITH CHEMICAL REACTION CHAMBER," filed Apr. 27, 2020, and U.S. patent application Ser. No. 17/005,222, entitled "FLUID DELIVERY SYSTEM," filed Aug. 27, 2020, the entire disclosures of which are incorporated herein by reference for all purposes.

BACKGROUND

Field

The field relates to flow control systems and, in particular, to fluid substance flow meters.

Description of the Related Art

Substance delivery systems can deliver a substance, e.g., a fluid substance, from one location to another. An example of a substance delivery system is a drug delivery system. In a drug delivery system, a drug can be stored in one place and the drug can be delivered to a patient's body. It can be important to controllably deliver a desired amount of the fluid to the patient's body.

SUMMARY

In one aspect, a flow meter is disclosed. The flow meter can include a housing that has a cavity, a deformable tube that is disposed in the cavity, and a cam that is rotatably coupled to the housing. The deformable tube includes a portion of a flow path of a fluid substance. A portion of the cam is configured to press against a portion of the deformable tube so as to deform the portion of the deformable tube. The cam is configured to rotate in response to a flow of the fluid substance in the flow path.

In one embodiment, the cam includes a plurality of teeth. The portion of the cam can include at least one tooth of the plurality of teeth. The plurality of teeth can be equally spaced circumferentially relative to a center of the cam. When a first tooth of the plurality of teeth and a second tooth of the plurality of teeth adjacent to the first tooth completely close off a first portion and a second portion of the deformable tube, respectively, an enclosed spacing between the first portion and the second portion of the deformable tube can be defined. The enclosed spacing can have a volume in a range of 0.125 µL to 1.25 µL.

In one embodiment, the portion of the cam is configured to completely close off the portion of the tube to inhibit flow of the fluid substance therethrough.

In one embodiment, the portion of the cam includes a roller that has a rounded shape.

In one embodiment, the flow meter does not comprise an internal actuator for rotating the cam.

In one embodiment, a pressure in the deformable tube generates more than 50% and less than 90% of torque of cam rotation.

In one embodiment, the flow meter further includes an actuator that is configured to assist in the rotation of the cam. The actuator includes an electroosmotic (EO) pump.

In one embodiment, the flow meter further includes a locking mechanism that is coupled to the housing. The locking mechanism can be configured to lock rotation of the cam in a circumferential direction.

In one embodiment, the flow meter further includes a sensor that is configured to detect movement of the cam.

In one aspect, a fluid delivery system to deliver a biocompatible fluid is disclosed. The fluid delivery system can include a flow meter that is positioned at a first location of a flow path of a fluid substance. The flow meter includes a housing that has a cavity, a deformable tube that is disposed in the cavity, and a cam that is rotatably coupled to the housing. The deformable tube defines a portion of a flow path of a fluid substance. A portion of the cam is configured to press against a portion of the deformable tube so as to deform the portion of the deformable tube. The fluid delivery system can also include a pump that is positioned upstream of the flow meter and configured to drive the fluid substance along the fluid flow path through the flow meter. The flow of the fluid substance that is provided by the pump drives rotation of the cam.

In one embodiment, the cam includes a plurality of teeth and the portion of the cam includes at least one tooth of the plurality of teeth. When a first tooth of the plurality of teeth and a second tooth of the plurality of teeth adjacent to the first tooth completely close off a first portion and a second portion of the deformable tube, respectively, an enclosed spacing between the first portion and the second portion of the deformable tube can be defined. The enclosed spacing can have a volume in a range of 0.125 µL to 1.25 µL.

In one embodiment, the portion of the cam includes a roller that has a round shape.

In one embodiment, the flow meter does not include an internal actuator for rotating the cam.

In one embodiment, the fluid delivery system further includes a locking mechanism that is coupled to the housing. The locking mechanism can be configured to lock rotation of the cam in a circumferential direction.

In one embodiment, the fluid delivery system further includes a sensor that is configured to detect movement of the cam.

In one embodiment, the pump includes an electroosmotic (EO) pump.

In one aspect, a fluid delivery system to deliver a biocompatible fluid is disclosed. The fluid delivery system can include a pump-driven flow meter positioned along a flow path of a fluid substance, and a pump that is configured to drive the fluid substance along the fluid flow path through the flow meter.

In one embodiment, the flow meter includes a housing that has a cavity, a deformable tube that is disposed in the cavity, and a cam that is rotatably coupled to the housing. The deformable tube can define a portion of the flow path of the fluid substance. A portion of the cam can be configured to press against a portion of the deformable tube so as to deform the portion of the deformable tube. The flow of the fluid substance can be provided by the pump drives rotation of the cam.

In one embodiment, the pump includes an electroosmotic (EO) pump. The EO pump can drive the pump-driven flow meter.

In one embodiment, the fluid delivery system further includes an electroosmotic (EO) pump that drives the pump-driven flow meter. The EO pump can be different from the pump.

BRIEF DESCRIPTION OF THE DRAWINGS

Embodiments of this disclosure will now be described, by way of non-limiting example, with reference to the accompanying drawings.

FIG. 1C is a schematic bottom pan view of the flow meter illustrated in FIGS. 1A-1B.

FIG. 1D is a schematic perspective view of a cap portion of the flow meter illustrated in FIGS. 1A-1C.

FIG. 1E is a close-up view of the flow meter illustrated in FIG. 1A.

FIG. 2B is a schematic side view of the flow meter with a light emitter and a light detector positioned at a bottom side of the flow meter.

FIG. 2C is a schematic side view of the flow meter with a light emitter positioned at the bottom side and a light detector positioned at a top side of the flow meter.

FIG. 3A is a schematic top plan view of the flow meter connected to a driver or actuator in a first state in which an electroosmotic (EO) pump is in an equilibrium state.

FIG. 3B is a schematic top plan view of the flow meter connected to the actuator in a second state in which the EO pump is in an active state.

DETAILED DESCRIPTION

Figure 1A:
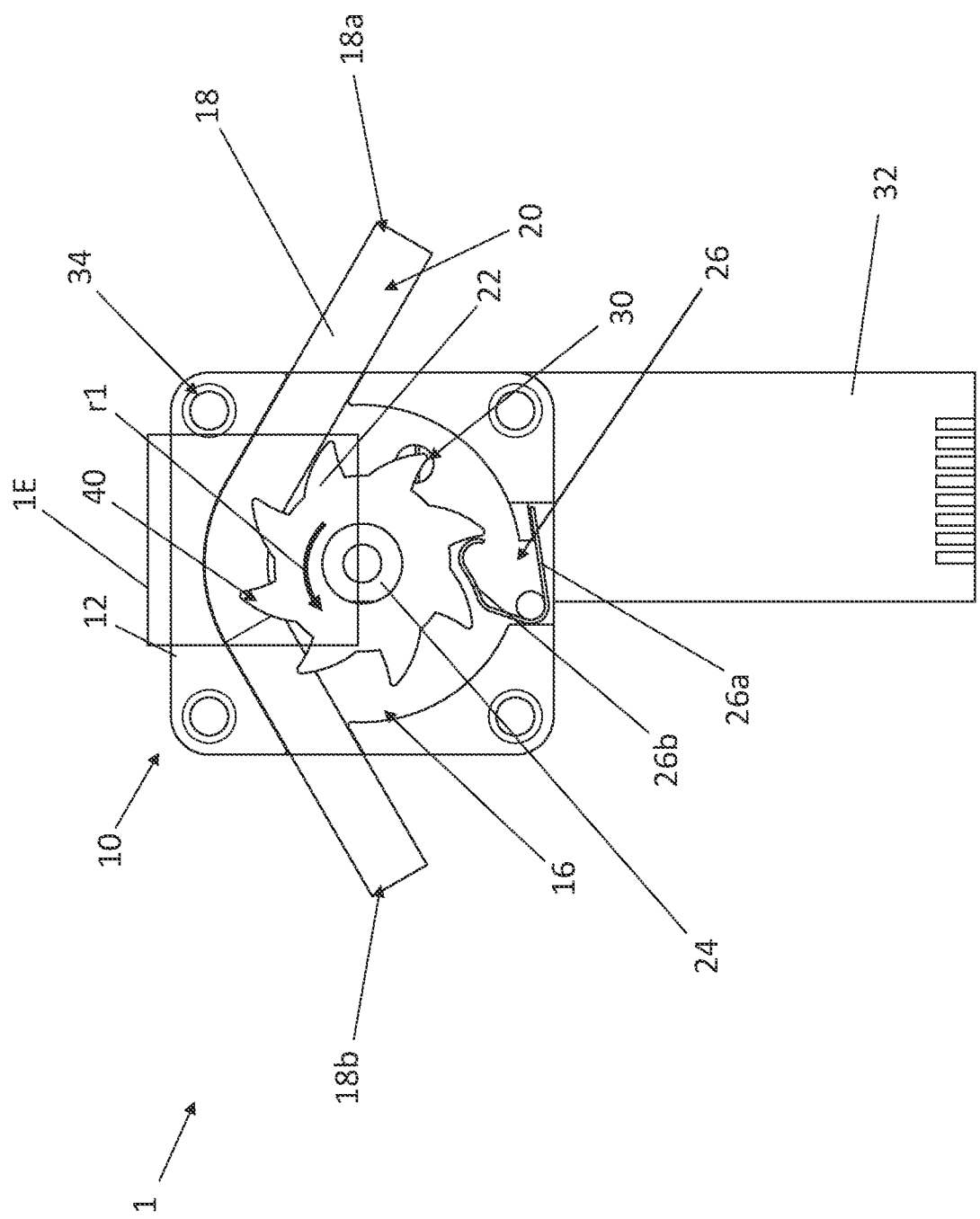
FIG. 1A is a schematic top plan view of a flow meter according to an embodiment.

Substance delivery systems, for example, a drug delivery system, can be used to deliver a fluid substance (e.g., a drug) disposed in a reservoir to a target location (e.g., inside a patient's vasculature, into analysis equipment, or to any other suitable target location). The drug can include, for example, insulin for treating diabetes, an anti-nausea drug for chemotherapy, etc. In such treatments, it can be important to accurately and precisely meter and deliver a controlled volume of the fluid substance to the target location. The drug delivery system can include a flow control system configured to control a volume of the substance to be delivered and a drug delivery device configured to deliver the substance to the target location.

The flow control system can include a flow meter. The flow meter can monitor/measure a flow rate and/or a flow amount (e.g., volume) of the substance. The flow meter can be associated with the drug delivery device to manage the flow rate and a volume of the substance to be delivered to the target location. As one example, it can be important to accurately and repeatedly monitor an amount of insulin delivered to a diabetic patient and to control the timing of the delivery. However, a conventional flow meter can be relatively large in size, and it can be difficult to measure or monitor the flow rate and/or the flow amount of the substance with a relatively fine accuracy. Also, the large size of conventional flow meters can be undesirable for certain applications, such as for use in a wearable device.

Various embodiments disclosed herein relate to a flow control system that includes a flow meter that can measure/monitor a flow rate and/or a flow amount of the substance with a relatively high degree of accuracy. In some embodiments, the flow meter can include a flow path and a cam that is configured to rotate in response to flow of the substance in the flow path. The fluid substance can be driven along the flow path by a pump. For example, the flow of the substance in the flow path can push a portion (e.g., a tooth) of the cam to rotate the cam. The flow path can at least partially be defined by a flexible or deformable material. For example, the flow path can be defined at least in part by a flexible or deformable tube. In some embodiments, the flow meter can be a passive flow meter that does not include a moving source or actuator as the main source for rotating the cam. In some embodiments, the flow meter can include an actuator (e.g., an electroosmotic (EO) pump) that assists the rotation of the cam. The flow meter can include a locking mechanism that can allow rotation of the cam in one rotational direction and that can lock rotation of the cam in the opposite rotational direction. The flow meter can include a sensor that can count rotations (or fractional rotations) of the cam. The technical advantages and principles disclosed herein can provide a relatively small flow meter that can achieve a precise measurement and/or control of substance flowing in the flow path.

Figure 1B:
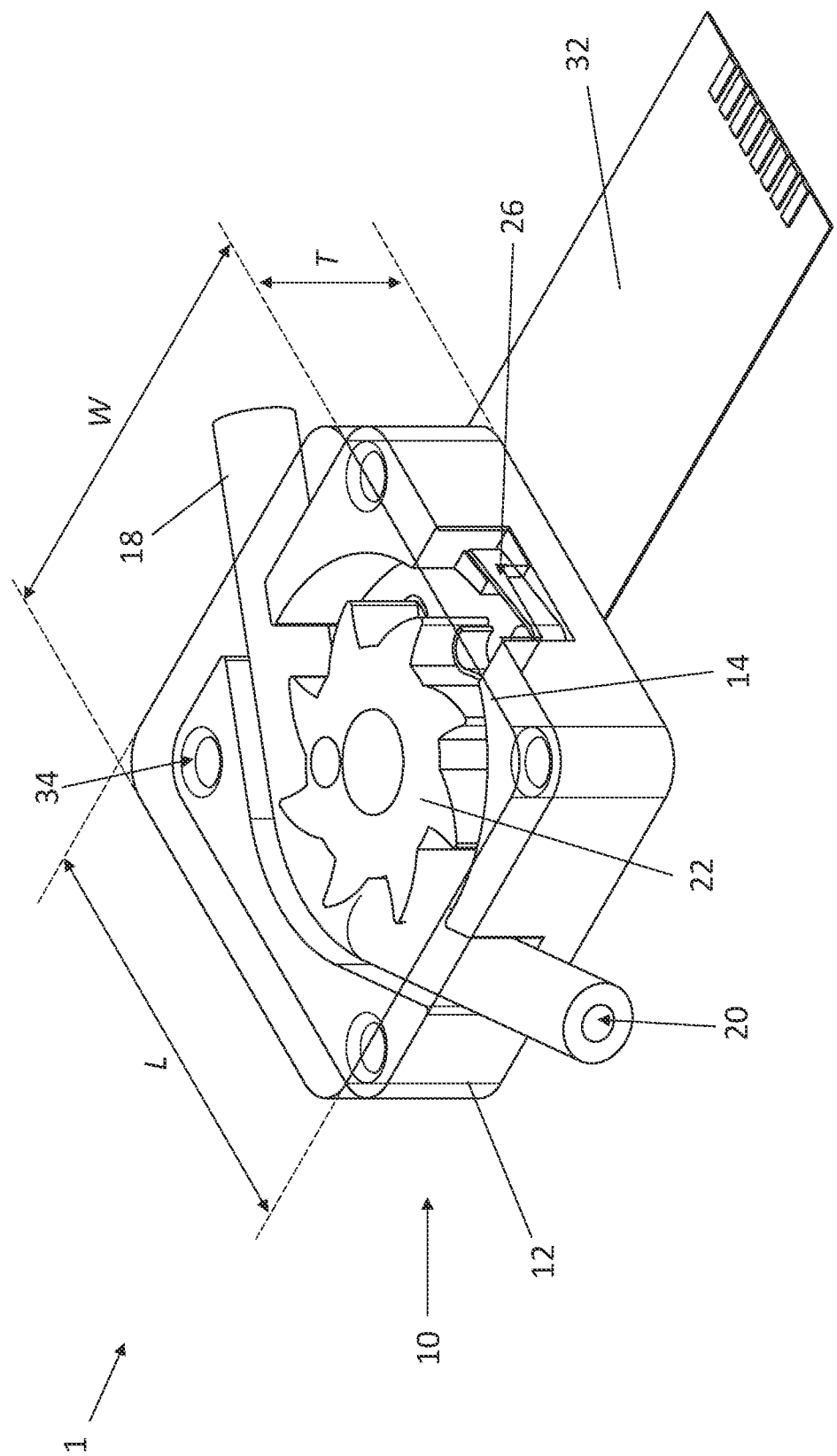
FIG. 1B is a schematic perspective view of the flow meter illustrated in FIG. 1A.

FIG. 1A is a schematic top plan view of a flow meter 1 according to an embodiment. FIG. 1B is a schematic perspective view of the flow meter 1 illustrated in FIG. 1A. FIG. 1C is a schematic bottom pan view of the flow meter 1 illustrated in FIGS. 1A-1B. FIG. 1D is a schematic perspective view of a cap portion 14 of the flow meter 1 illustrated in FIGS. 1A-1C. FIG. 1E is a close-up view of a portion of the flow meter 1 illustrated in FIG. 1A.

The flow meter 1 can include a housing 10 that comprises a base portion 12 and the cap portion 14 coupled to the base portion 12. The cap portion 14 is not shown in FIG. 1A to show internal components of the flow meter 1. The base portion 12 of the housing 10 can have an cavity 16. The flow meter 1 can include a tube 18 disposed in the cavity 16. The tube 18 can define at least a portion of a flow path 20 of a fluid substance. In some embodiments, the fluid substance can comprise a drug. The drug can include, for example, insulin for treating diabetes, an anti-nausea drug for chemotherapy, etc. The flow meter 1 can include a cam 22 disposed in the cavity 16 and rotatably coupled to the housing 10 through a pin 24. The pin 24 can be part of the housing 10, or separate from and fixed to the housing 10. The cam 22 can rotate about the pin 24. The flow meter 1 can include a locking mechanism 26 that allows the cam to rotate in one rotational direction r1 while preventing the cam from rotating in a rotational direction opposite the one rotational direction r1.

The housing 10 can comprise any suitable material. For example, the housing 10 can comprise a molded housing, such as plastic or polymer (e.g., liquid crystal polymer (LCP) or acrylonitrile butadiene styrene (ABS)). The housing 10 can comprise a window 30 for a sensor (not shown) that detects the rotation of the cam 22. In some embodiments, the window 30 can be formed in the base portion 12 of the housing 10. In some embodiments, the sensor can be mounted on a substrate 32 (e.g., a flexible substrate) which can be coupled with the housing 10. The substrate 32 can also include connection terminals for electrically connecting the substrate 32 to an external system or device (not shown). Additional details about the window 30 and the sensor are described with respect to FIGS. 2B and 2C.

In some embodiments, the base portion 12 and the cap portion 14 of the housing 10 can be coupled together by way of an adhesive. In some embodiments, the base portion 12 can comprise voids 34, and the cap portion 14 can comprise protrusions 36 that are configured to mate with the voids 34 thereby aligning the base portion 12 with the cap portion 14. In some embodiments, the base portion 12 and/or the cap portion 14 can be shaped so as to receive the locking mechanism 26. In some embodiments, the locking mechanism 26 can comprise a torsion spring lock having a first arm 26a and a second arm 26b. For example, the first arm 26a can be fixed to a portion of the housing 10, and the second arm 26b can act on the cam 22 to lock the rotation of the cam 22 in a particular rotational direction.

The tube 18 can comprise a flexible or deformable tube, such as a rubber tube. In some embodiments, the tube can be a biocompatible, flexible tube. The tube 18 has an upstream side 18a and a downstream side 18b. In some embodiments, the fluid substance can flow from upstream side 18a to the downstream side 18b. The cam 22 can comprise teeth 40. As the fluid substance flows from the upstream side 18a to the downstream side 18b (e.g., driven by an actuator or pump), a flow of the fluid substance through the deformable tube 18 can push one of the teeth 40 and rotate the cam 22 about the pin 24. In some embodiments, at least one of the teeth 40 can press or pinch (e.g., deform) the tube 18 so as to completely close off a portion of the tube 18. In some other embodiments, the teeth 40 may not completely close off the portion of the tube 18. FIG. 1E shows a state of the flow meter 1 in which a first tooth 40a and a second tooth 40b of the teeth 40 completely close off a first portion 18c and a second portion 18d of the tube 18. When the first portion 18c and the second portion 18d of the tube 18 are closed off, an enclosed spacing in the tube 18 between the first portion 18c and the second portion 18d can be defined. The enclosed spacing can have a volume V of the fluid substance. The volume V of the fluid substance can be in a range of about 0.125 µL to about 1.25 µL. For example, the volume V of the fluid substance can be in a range of 0.125 µL to 1.25 µL, 0.25 µL to 1.25 µL, 0.5 µL to 1.25 µL, 0.125 µL to 1 µL, 0.125 µL to 0.75 µL, or 0.5 µL to 0.75 µL. When the position of the second tooth 40b moves to the position of the first tooth 40a as illustrated in FIG. 1E, the volume V of the fluid substance can be delivered to the downstream side 18b of the tube 18. When the teeth 40 are evenly distributed, the same volume V of the fluid substance can be delivered at each time when one tooth moves from a position to a position of an adjacent tooth.

In some embodiments, the flow meter 1 can be a passive flow meter in which no motor or actuator that directly rotates the cam 22 is included, and all the torque of the cam rotation is provided by the flow of the fluid substance in the tube 18. The cam 22 in the passive flow meter can be indirectly driven by a pump that drives the fluid substance through the tube 18. In some other embodiments, the flow meter 1 can comprise a motor or actuator that applies force to the cam 22 to rotate the cam 22 (see FIGS. 3A and 3B). For example, more than a half the torque of the cam rotation can be provided by the flow of the fluid substance and the rest of the torque can be provided by the actuator.

The tube 18 has an inner diameter and an outer diameter. In some embodiments, the inner diameter of the tube 18 can be in a range between about 0.25 mm to about 0.8 mm, about 0.4 mm to about 0.8 mm, or about 0.25 mm to about 0.5 mm. In some embodiments, the outer diameter of the tube 18 can be in a range of about 0.5 mm to about 1.6 mm, about 1 mm to about 1.6 mm, or about 0.5 mm to about 1 mm.

The cam 22 can include any number of the teeth 40. The teeth can be arranged in any suitable manner. In some embodiments, the teeth 40 can be equally spaced circumferentially around the cam 22 relative to a center of the cam 22. In such embodiments, a tooth can be spaced apart by a spacing from an adjacent tooth. In some embodiments, the spacing can have a volume that will enable the volume V of the fluid substance in the enclosed spacing in the tube 18 between the first portion 18c and the second portion 18d in a range of about 0.125 µL to about 1.25 µL.

The housing 10 has a length L, a width W, and a thickness T The length L of the housing 10 can be about 10 mm. For example, the length L can be in a range of 5 mm to 15 mm, 7 mm to 15 mm, 5 mm to 13 mm, or 7 mm to 13 mm. The width W of the housing 10 can be about 10 mm. For example, the width W can be in a range of 5 mm to 15 mm, 7 mm to 15 mm, 5 mm to 13 mm, or 7 mm to 13 mm. The thickness Tof the housing 10 can be about 3.75 mm. For example, the thickness T can be in a range of 2 mm to 6 mm, 3.5 mm to 6 mm, 2 mm to 4 mm, or 3.5 mm to 4 mm. Beneficially, the housing 10 can be sized sufficiently small so as to be portable, e.g., wearable by a user.

Figure 5:
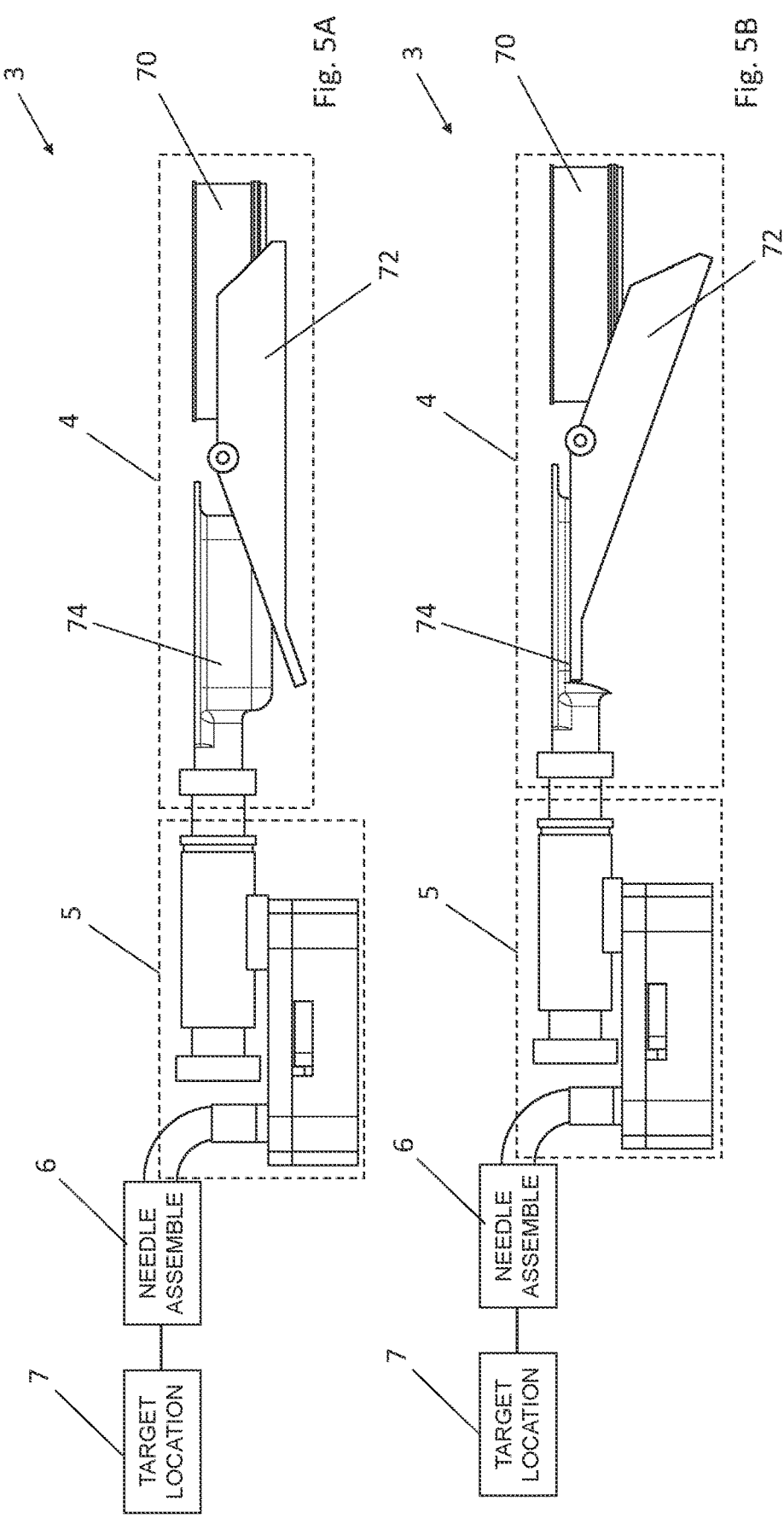
FIG. 5A illustrates a schematic system diagram of a substance delivery system that includes a substance delivery device, a flow control system, and needle assembly, in a first state according to one embodiment.
FIG. 5B illustrates a schematic system diagram of the substance delivery system illustrated in FIG. 5A in a second state.
Figure 6:
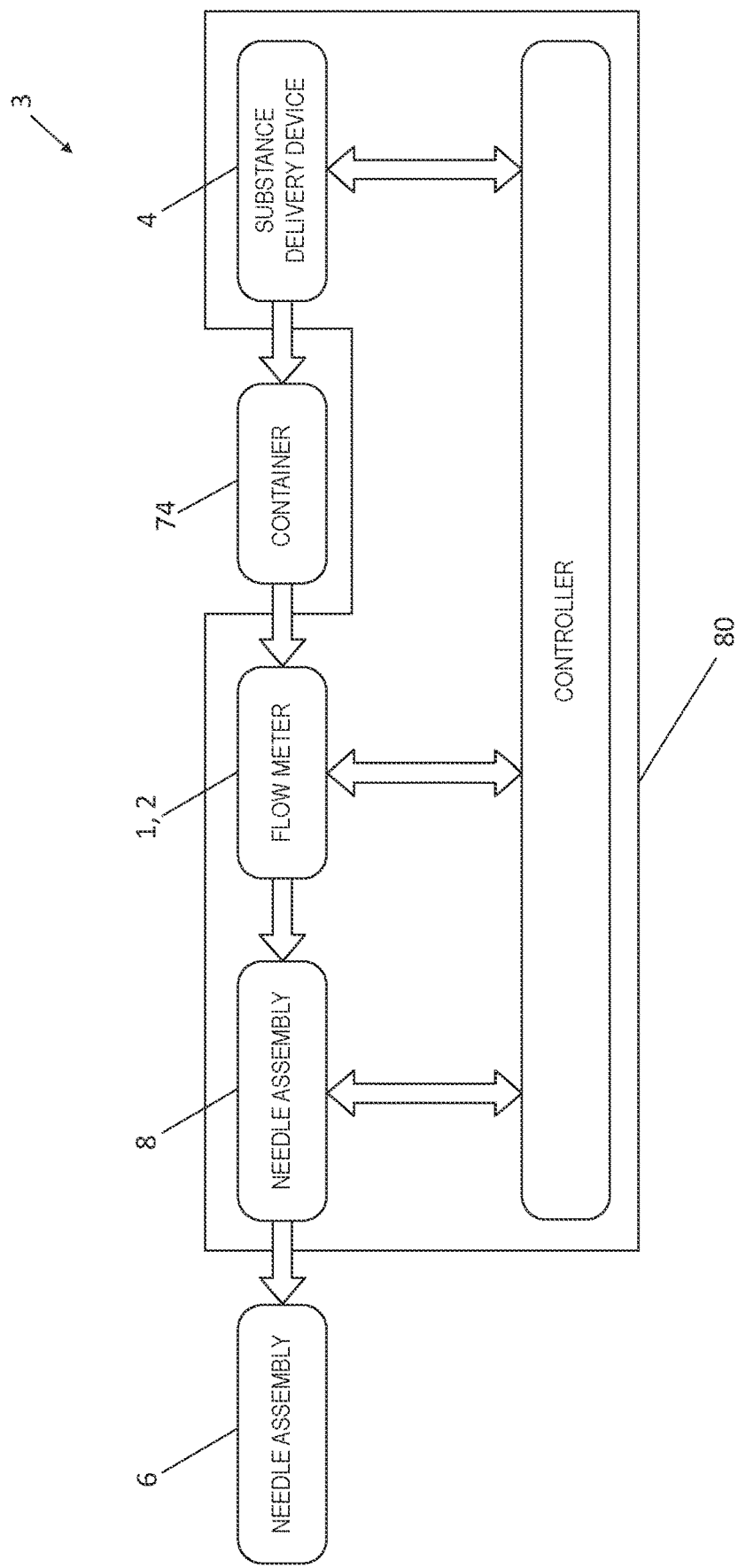
FIG. 6 is a block diagram of a substance delivery system according to one embodiment.

In some embodiments, the upstream side 18a of the tube 18 can be connected to a pump that drives the fluid substance (see FIGS. 5A-6). The pump can drive the rotation of the cam 22 through a flow of the fluid substance. In some embodiments, the downstream side 18b of the tube 18 can be coupled to a needle assembly. In some applications, a needle can be inserted into a patient's body through the skin such that the fluid substance (e.g., drug) delivered from a container can be conveyed to an interior of the patient (e.g., the patient's vascular system) through the needle assembly 6.

Figure 2A:
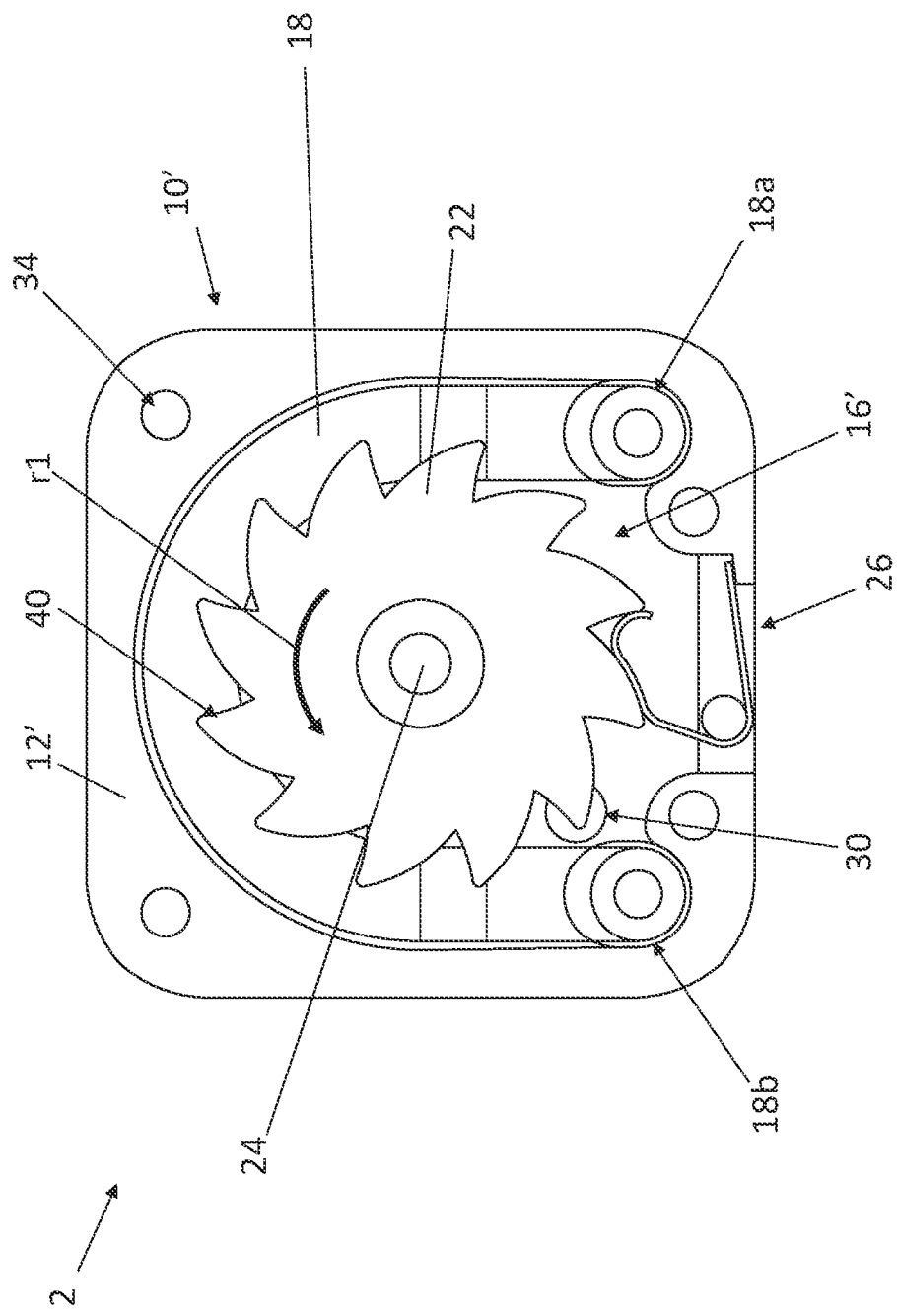
FIG. 2A is a schematic top plan view of a flow meter according to another embodiment.

FIGS. 2A-2C illustrate various views of a flow meter 2 according to another embodiment. FIG. 2A is a schematic top plan view of the flow meter 2. FIG. 2B is a schematic side view of the flow meter 2 with a light emitter 44 and a light detector 46 positioned at a bottom side 2a of the flow meter 2. FIG. 2C is a schematic side view of the flow meter 2 with a light emitter 44 positioned at the bottom side 2a and a light detector 46 positioned at a top side 2b of the flow meter 2. Unless otherwise noted, the components of FIGS. 2A-2C may be the same as or generally similar to like-numbered components of FIGS. 1A-1D. Unlike the flow meter 1 illustrated in FIGS. 1A-1D, in the flow meter 2, the housing 10' is shaped such that when the tube is disposed in an cavity 16' of the housing 10', an upstream side 18a and a downstream side 18b of the tube 18 come out through a cap portion 14 of the housing 10'.

The flow meter 2 can include the housing 10' that comprises a base portion 12' and the cap portion 14' coupled to the base portion 12'. The base portion 12' of the housing 10' can have an cavity 16'. The flow meter 2 can include a tube 18 disposed in the cavity 16'. The tube 18 can define at least a portion of a flow path 20 of a fluid substance. In some embodiments, the fluid substance can comprise a drug. The drug can include, for example, insulin for treating diabetes, an anti-nausea drug for chemotherapy, etc. The flow meter 2 can include a cam 22 disposed in the cavity 16 and rotatably coupled to the housing 10' through a pin 24. The pin 24 can be part of the housing 10' or separate from the housing 10' can be fixed to the housing 10'. The cam 22 can rotate about the pin 24. The flow meter 2 can include a locking mechanism 26 that allows the cam to rotate in one rotational direction r1 while preventing the cam from rotating in a rotational direction opposite the one rotational direction r1.

The flow meter 2 can comprise a sensor device for detecting or counting rotation of the cam 22. For example, the sensor device can comprise an optical sensor, a magnetic sensor (e.g., an anisotropic magnetoresistive (AMR) sensor), a mechanical sensor, resolver to digital converter (RDC), or any other suitable sensor for detecting or counting rotation of the cam 22. In some embodiments, the flow meter 2 can comprise an optical sensor that includes the light emitter 44 and the light detector 46 that are mounted on the substrate 32. The substrate 32 can comprise a flexible substrate that including a nonconductive material and a plurality of embedded metal traces. For example, the substrate 32 can comprise a flexible pigtail substrate.

In FIG. 2B, in which the light emitter 44 (e.g., a light emitting diode) and the light detector 46 (e.g., a photo diode) are positioned at the bottom side 2a of the flow meter 2, the light emitter 44 can emit light towards the window 30. As the cam 22 rotates, the teeth 40 can pass over the window 30. When one of the teeth 40 is positioned over the window 30, the one of the teeth 40 can reflect the light emitted from the light emitter 44 back to the light detector 46. The light emitter 44 and the light detector 46 can be mounted to the substrate 32 and data collected thought the light detector 46 can be sent to an external system or device through the substrate 32 for analyzing the data. By analyzing the data, the rotation angle, rotation count, and/or rotation speed of the cam 22 can be measured. As explained above, the spacing of adjacent teeth 40 can be selected to retain a predetermined volume of the fluid substance in the segment of the tube 18 pinched or deformed between the adjacent teeth. Based on the predetermined volume and the measured rotation of the cam 22, the overall volume of the fluid substance delivered to the patient can be monitored. In some embodiments, additional electronic components can be mounted on the substrate 32. In some embodiments, the electronic components can process data received from the light detector 46. The cam 22 can comprise a reflective surface and the housing can comprise absorptive surface for improved accuracy of the measurement.

In FIG. 2C, the light emitter 44 is positioned at the bottom side 2a of the flow meter 2 and the light detector 46 is positioned at the top side 2b of the flow meter 2. The light emitter 44 can emit light upwardly towards the window 30. As the cam 22 rotates, the teeth 40 can pass over the window 30. When no portion of the cam 22 is positioned over the window 30, light emitted from the light emitter 44 can reach the light detector 46, and when one of the teeth 40 is positioned over the opening, the light can be blocked by the one of the teeth 40 such that the light does not reach the light detector 46. The light emitter 44 and the light detector 46 can be mounted to the substrate 32' and data collected thought the light detector 46 can be sent to an external system or device through the substrate 32' for analyzing the data. By analyzing the data, the rotation angle, rotation count, and/or rotation speed of the cam 22 can be measured. As explained above, the spacing of adjacent teeth 40 can be selected to retain a predetermined volume of the fluid substance in the segment of the tube 18 pinched or deformed between the adjacent teeth. Based on the predetermined volume and the measured rotation of the cam 22, the overall volume of the fluid substance delivered to the patient can be monitored.

In some embodiments, the plurality of electronic components can include an analog-to-digital convertor and/or passive components. In some embodiment, the electronic components can comprise an application specific integrated circuit (ASIC) die that can receive signals transduced by the light detector 46 and can pre-process the signals before transmission to a larger electronic system.

FIG. 3A is a schematic top plan view of the flow meter 2 connected to a driver or actuator 50 in a first state in which an electroosmotic (EO) pump 52 is in an equilibrium state. FIG. 3B is a schematic top plan view of the flow meter 2 connected to the actuator 50 in a second state in which the EO pump 52 is in an active state.

The actuator 50 can include the EO pump 52, a piston structure 54 coupled with the EO pump 52, and arms 56 that couples a slider or piston head 58 and the cam 22. In some embodiments, in the first state, no external power (e.g., a voltage) may be applied to the EO pump 52. In the second state, electrical power (e.g., a voltage) is applied to the EO pump 52. In some embodiments, a coin cell battery can provide the voltage. In some embodiments, the actuator 50 can operate with applied voltage of less than about 5V. Alternating motion provided by switching between the first state and the second state, the piston head 58 can move back-and-forth. The back-and-forth movement can be converted into a rotational movement by the arms 56, thereby rotating the cam 22. In some embodiments, the actuator 50 can assist the cam 22 with rotation. For example, more than 50% of torque of the cam rotation can be provided by the pressure in the tube 18, and the rest of the torque of the cam rotation can be provided by the actuator 50. In some embodiments, more than 50% and less than 90% of torque of the cam rotation can be provided by the pressure in the tube 18, and the rest of the torque of the cam rotation can be provided by the actuator 50, depending on, for example, a viscosity of the fluid substance. The actuator 50 can be particularly beneficial when the fluid substance comprises a relatively high density, high viscosity fluid to provide a smooth rotation of the cam 22.

Figure 4:
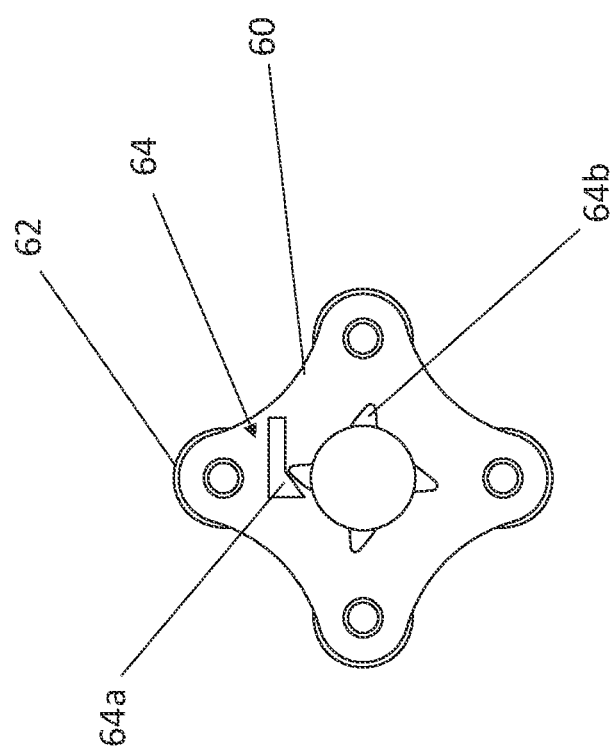
FIG. 4 illustrates a roller cam according to an embodiment.

FIG. 4 illustrates a roller cam 60 according to an embodiment. The roller cam 60 can be used in place of the cam 22 illustrated in FIGS. 1A-3B, and any principles and advantages disclosed herein can be utilized in connection with the roller cam 60. The roller cam 60 can comprise a plurality of rollers 62 and a locking mechanism 64. Each of the rollers 62 can comprise a rounded shape. When the roller cam 60 is used in place of the cam 22 in the flow meter 1 illustrated in FIGS. 1A-1D, the roller 62 can act as one of the teeth 40 and the roller cam 60 can rotate about the pin 24. Beneficially, the rounded shape of the rollers 62 may impart less wear to the tube 18 than the teeth 40 in some embodiments. The locking mechanism 64 allows the cam to rotate in one rotational direction while preventing the cam from rotating in a rotational direction opposite the one rotational direction. In some embodiments, the locking mechanism 64 can include a locking arm 64a and a plurality of teeth 64b that can rotate with the roller cam 60. The locking arm 64a can be fixed to a housing of a flow meter. In the illustrated embodiment, at each quarter of a rotation in the one rotational direction, the locking arm 64a is pushed by a tooth of the plurality of teeth 64b. When the roller cam 60 is rotated in the rotational direction opposite the one rotational direction, the locking arm 64a blocks the tooth of the plurality of teeth 64b and prevents the roller cam 60 from further rotating in the rotational direction opposite the one rotational direction.

FIG. 5A illustrates a schematic system diagram of a substance delivery system 3 that includes a substance delivery device 4, a flow control system 5, and needle assembly 6, in a first state according to one embodiment. FIG. 5B illustrates a schematic system diagram of the substance delivery system 3 illustrated in FIG. 5A in a second state. The flow control system 5 can comprise any flow meter disclosed herein, such as the flow meter 1, 2. The substance delivery system 3 can deliver a substance from the substance delivery device 4 through the flow control system 5 and the needle assembly 6 to a target location 7. The target location 7 can be, for example, inside of a patient's body (for example, inside the vascular system of the patient), or an external device (for example, analysis equipment configured to analyze or test blood, drugs, or other fluids).

The substance delivery device 4 can comprise a pump 70 and lever 72, and a container 74. In some embodiments, the pump 70 can comprise an EO pump. The container 74 (e.g., a drug pod) can be configured to receive and hold a fluid substance (e.g., a drug). The substance delivery device 4 can also include a packaging structure (not illustrated) which can package the pump 70, lever 72, and the container 74. Additional details of substance delivery systems may be found at least in U.S. application Ser. No. 16/851,798, U.S. patent application Ser. No. 16/859,665, and U.S. patent application Ser. No. 17/005,222, the entire contents of which are incorporated by reference herein in their entirety and for all purposes.

The flow control system 5 can be positioned downstream of the substance delivery device 4. For example, the flow control system 5 can be positioned between the substance delivery device 4 and the target location 7 (e.g., a patient's body). In some embodiments, the flow control system 5 can be in communication with a controller that can control an operation of the substance delivery device 4. The delivery device 4 can drive a fluid substance from the container 74 to the target location 7 through the flow control system 5 and the needle assembly 6.

FIG. 6 is a block diagram of a substance delivery system 3 according to one embodiment. The substance delivery system 3 can include a substance delivery device 4, a container 74, a flow meter 1, 2, a valve 8, a needle assembly 6, and a controller 9. In some embodiments, the flow meter 1, 2, can comprise a valve and the separate valve 8 can be omitted. In some embodiments, the substance delivery device 4, the flow meter 1, 2, the valve 8, and the controller 9 can define a substance delivery module 80.

The flow meter 1, 2 can monitor a flow rate and/or a flow amount of the substance flowing through the flow meter 1, 2 from the container 74. The valve 8 can prevent or mitigate a backflow of the substance. In some embodiments, the valve 8 can control the substance flow through the flow pathway. The controller 9 can control operation of the substance delivery module 80. The controller 9 can include processing electronics that are programmed to control operations of the substance delivery system 3. The controller 9 can include one or more processors, one or more memory devices, etc. For example, the substance delivery device 4, the flow meter 1, 2, and/or the valve 8 can connect to the controller 9, and can be controlled by the controller 9. In some embodiments, the substance delivery device 4, the flow meter 1, 2 and the valve 8 can be connected to the controller 9 through a wired connection, or wirelessly (e.g., electromagnetically). In some embodiments, the controller 9 can comprise or be connected to a user interface (including, e.g., buttons, displays, etc.) that can allow a user to control the substance delivery module 80, or to monitor the activities of the substance delivery module 80. In some embodiments, the controller 9 can be connected to other sensors, such as an accelerometer, thermometer, etc. In some embodiments, the controller 9 can be connected to a vital sign monitoring device. In some embodiments, the controller 9 can be programed to deliver a programmed amount of a substance (e.g., a drug) to a target location over time. For example, the controller 9 can be programed such that after a time period T(x), a voltage V(x) is applied to the pump 70 of the substance delivery device 4. In response to the voltage V(x) applied, the elastic displacement d and the volume v can be increased and/or decreased, depending on the desired dosage to be delivered to the patient at a particular time.

In some applications, the flow meter 1, 2 can monitor a flow of a fluid substance to measure a delivered volume of the substance, a flow rate, and/or a flow direction (e.g., forward flow or backflow). The measured data can be compared against a predetermined or prescribed dosage of the substance. The measured data can be used to regulate the voltage on an actuator of the valve 8, the EO pump 52 of the actuator 50, and/or the pump 70 of the substance delivery device 5, in order to modulate and/or control the volume of the substance delivered to the target location. The measured data can be used to operate, for example, the valve 8 (e.g., a shutoff valve or check valve) and/or the substance delivery device 5.

In some applications, the controller 9 can be programmed to send a start signal to the substance delivery device 5 to activate the substance delivery device 5 at a predetermined time, on command from the user or clinician, or based on other criteria. In response, the substance delivery device 5 can drive a substance from the container 74 through a flow path by way of the flow meter 1, 2, the valve 8, and the needle assembly 6 to a target location.

The needle assembly 6 can comprise a conduit (e.g., a tube) and a needle that is coupled to the conduit. In some applications, the needle can be inserted into a patient's body through the skin such that the fluid substance (e.g., drug) delivered from the container by the substance delivery module 80 is conveyed to an interior of the patient (e.g., the patient's vascular system) through the needle assembly 6.

Although disclosed in the context of certain embodiments and examples, it will be understood by those skilled in the art that the present invention extends beyond the specifically disclosed embodiments to other alternative embodiments and/or uses and obvious modifications and equivalents thereof. In addition, while several variations have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the present disclosure. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the aspects that follow.

What is claimed is:

1. A flow meter comprising:
a housing having a cavity;
a deformable tube disposed in the cavity, the deformable tube comprising a portion of a flow path of a fluid substance;
a cam rotatably coupled to the housing, a portion of the cam configured to press against a portion of the deformable tube so as to deform the portion of the deformable tube, the cam configured to rotate in response to a flow of the fluid substance in the flow path; and an actuator configured to assist in the rotation of the cam.

2. The flow meter of claim 1, wherein the cam comprises a plurality of teeth, and wherein the portion of the cam comprises at least one tooth of the plurality of teeth.

3. The flow meter of claim 2, wherein the plurality of teeth are equally spaced circumferentially relative to a center of the cam.

4. The flow meter of claim 2, wherein when a first tooth of the plurality of teeth and a second tooth of the plurality of teeth adjacent to the first tooth completely close off a first portion and a second portion of the deformable tube, respectively, an enclosed spacing between the first portion and the second portion of the deformable tube is defined, wherein the enclosed spacing has a volume in a range of 0.125 µL to 1.25 µL.

5. The flow meter of claim 1, wherein the portion of the cam is configured to completely close off the portion of the tube to inhibit flow of the fluid substance therethrough.

6. The flow meter of claim 1, wherein the portion of the cam comprises a roller that has a rounded shape.

7. The flow meter of claim 1, wherein a pressure in the deformable tube generates more than 50% and less than 90% of torque of cam rotation.

8. The flow meter of claim 1, wherein the actuator comprising an electroosmotic (EO) pump.

9. The flow meter of claim 1, further comprising a locking mechanism coupled to the housing, the locking mechanism configured to lock rotation of the cam in a circumferential direction.

10. The flow meter of claim 1, further comprising a sensor configured to detect movement of the cam.

11. The flow meter of claim 10, wherein the sensor comprises an optical sensor.

12. A fluid delivery system to deliver a biocompatible fluid comprising:

a flow meter positioned at a first location of a flow path of a fluid substance, the flow meter comprising a housing having a cavity, a deformable tube disposed in the cavity, and a cam rotatably coupled to the housing, the deformable tube defining a portion of a flow path of a fluid substance, and a portion of the cam configured to press against a portion of the deformable tube so as to deform the portion of the deformable tube; and a pump positioned upstream of the flow meter and configured to drive the fluid substance along the fluid flow path through the flow meter, wherein the flow of the fluid substance provided by the pump drives rotation of the cam, and wherein a pressure in the deformable tube partially generates torque of the rotation of the cam.

13. The fluid delivery system of claim 12, wherein the cam comprises a plurality of teeth and the portion of the cam comprises at least one tooth of the plurality of teeth, wherein when a first tooth of the plurality of teeth and a second tooth of the plurality of teeth adjacent to the first tooth completely close off a first portion and a second portion of the deformable tube, respectively, an enclosed spacing between the first portion and the second portion of the deformable tube is defined, wherein the enclosed spacing has a volume in a range of 0.125 µL to 1.25 µL.

14. The fluid delivery system of claim 12, further comprising a locking mechanism coupled to the housing, the locking mechanism configured to lock rotation of the cam in a circumferential direction.

15. The flow meter of claim 12, further comprising an actuator configured to generate the rest of the torque of the rotation of the cam.

16. A fluid delivery system to deliver a biocompatible fluid comprising:

a pump-driven flow meter along a flow path of a fluid substance;

a first pump configured to drive the fluid substance along the fluid flow path through the flow meter; and a second pump configured to drive the pump-driven flow meter, wherein the second pump comprises an electroosmotic (EO) pump, the EO pump being different from the first pump.

17. The fluid delivery system of claim 16, wherein the flow meter comprises a housing having a cavity, a deformable tube disposed in the cavity, and a cam rotatably coupled to the housing, the deformable tube defines a portion of the flow path of the fluid substance.

18. The fluid delivery system of claim 17, wherein a portion of the cam is configured to press against a portion of the deformable tube so as to deform the portion of the deformable tube, and the flow of the fluid substance provided by the first pump drives rotation of the cam.

19. The fluid delivery system of claim 16, wherein the first pump comprises a second electroosmotic (EO) pump, and the second EO pump drives the pump-driven flow meter.

20. The fluid delivery system of claim 16, wherein a pressure in the flow path partially generates movement of the pump-driven flow meter.

* * * * *

UNITED STATES PATENT AND TRADEMARK OFFICE
CERTIFICATE OF CORRECTION

| | |
|---|---|
| PATENT NO. | : 11,796,367 B2 |
| APPLICATION NO. | : 17/315050 |
| DATED | : October 24, 2023 |
| INVENTOR(S) | : Vikram Venkatadri |

It is certified that error appears in the above-identified patent and that said Letters Patent is hereby corrected as shown below:

In the Claims

Column 12, Line 19, Claim 15, delete "flow meter" and insert -- fluid delivery system --.

Signed and Sealed this
Twenty-third Day of January, 2024

Katherine Kelly Vidal
*Director of the United States Patent and Trademark Office*